United States Patent
Roplekar et al.

(10) Patent No.: US 11,008,993 B2
(45) Date of Patent: May 18, 2021

(54) SINGLE SOLID STATE POWER SUPPLY FOR MULTIPLE ENGINE SYSTEMS

(71) Applicant: Caterpillar Inc., Deerfield, IL (US)

(72) Inventors: Jay Roplekar, Peoria, IL (US); Chris Meischner, Washington, IL (US); Jeffery Fischer, Brimfield, IL (US); Thomas Smith, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 16/138,746

(22) Filed: Sep. 21, 2018

(65) Prior Publication Data

US 2020/0095970 A1    Mar. 26, 2020

(51) Int. Cl.
| | |
|---|---|
| F02B 63/04 | (2006.01) |
| H02P 9/02 | (2006.01) |
| F02N 11/08 | (2006.01) |
| F02N 11/04 | (2006.01) |

(52) U.S. Cl.
CPC .......... F02N 11/0866 (2013.01); F02B 63/04 (2013.01); H02P 9/02 (2013.01); F02N 11/04 (2013.01)

(58) Field of Classification Search
None
See application file for complete search history.

(56) References Cited

U.S. PATENT DOCUMENTS

| | | | |
|---|---|---|---|
| 4,231,073 A | 10/1980 | Suchko | |
| 6,066,897 A * | 5/2000 | Nakamura | F02D 25/00 290/4 A |
| 7,285,871 B2 * | 10/2007 | Derouineau | F02C 9/26 290/52 |
| 8,008,800 B2 * | 8/2011 | Mackin | A01D 41/1274 307/9.1 |
| 9,346,363 B2 * | 5/2016 | Hatanaka | B60L 11/08 |
| 9,849,996 B2 * | 12/2017 | Judge | B64D 43/00 |
| 9,889,746 B2 | 2/2018 | Wolff et al. | |
| 10,023,195 B2 * | 7/2018 | Miller | E02F 3/30 |
| 10,158,248 B2 * | 12/2018 | Dorn | H02J 9/061 |
| 10,183,673 B2 * | 1/2019 | Miller | B60W 20/13 |

(Continued)

FOREIGN PATENT DOCUMENTS

| | | |
|---|---|---|
| EP | 3064748 A1 | 9/2016 |
| KR | 20180020459 A | 2/2018 |

*Primary Examiner* — Tulsidas C Patel
*Assistant Examiner* — S. Mikailoff
(74) *Attorney, Agent, or Firm* — Harrity & Harrity LLP (57) ABSTRACT

A power generation system is disclosed. The power generation system may include a first engine and a second engine. The power generation system may include an alternating current (AC) generator coupled to the first engine and a solid state power supply connected to the AC generator via a first circuit. The power generation system may include a first energy storage device associated with the first engine, connected to the solid state power supply via a second circuit, and a first engine control module (ECM) associated with the first engine, connected to the solid state power supply via the second circuit. The power generation system may include a second energy storage device associated with the second engine, connected to the solid state power supply via the second circuit, and a second ECM associated with the second engine, connected to the solid state power supply via the second circuit.

20 Claims, 3 Drawing Sheets

(56) References Cited

U.S. PATENT DOCUMENTS

| | | | |
|---|---|---|---|
| 10,201,869 B2* | 2/2019 | Enyedy | B23K 9/1043 |
| 2009/0287382 A1* | 11/2009 | Blum | B63H 21/21 |
| | | | 701/51 |
| 2010/0295368 A1* | 11/2010 | Mackin | A01D 41/1274 |
| | | | 307/9.1 |
| 2012/0056436 A1 | 3/2012 | Russell et al. | |
| 2014/0125121 A1* | 5/2014 | Edwards | B60R 16/03 |
| | | | 307/9.1 |
| 2014/0333126 A1* | 11/2014 | Vyas | B60R 16/03 |
| | | | 307/9.1 |
| 2015/0097422 A1* | 4/2015 | Toothman | H02J 9/00 |
| | | | 307/9.1 |
| 2015/0225089 A1* | 8/2015 | Judge | B64D 43/00 |
| | | | 701/3 |
| 2015/0377203 A1* | 12/2015 | Neet | B60W 10/26 |
| | | | 290/31 |
| 2017/0036291 A1* | 2/2017 | Enyedy | B23K 9/1043 |
| 2018/0043894 A1* | 2/2018 | Miller | B60W 20/13 |
| 2018/0229732 A1* | 8/2018 | Miller | B60W 20/13 |
| 2020/0095970 A1* | 3/2020 | Roplekar | F02B 63/04 |
| 2020/0208566 A1* | 7/2020 | Roplekar | F01P 7/048 |

* cited by examiner

SINGLE SOLID STATE POWER SUPPLY FOR MULTIPLE ENGINE SYSTEMS

TECHNICAL FIELD

The present disclosure relates generally to a power supply and, more particularly, to a solid state power supply configuration for multiple engine systems.

BACKGROUND

A plurality of internal combustion engine systems, wherein each engine system includes a main alternator, may be used in various implementations to provide power to a load when a single engine system is not sufficient to provide power to the load. For example, a plurality of generators may be configured to provide electrical power to a load that requires more power than a single generator can output. In some cases, an engine system may include a second alternator, such as a charging alternator, to serve as a direct current (DC) power source for batteries that provide power to electronic control modules (ECMs) that control various operations of the engine system. However, the second alternator is a mechanically driven component of the engine system and requires an elaborate mounting of components (e.g., engine pulleys) on an engine of the engine system. These components may be expensive and/or prone to failure, damage, and/or the like.

One attempt to simplify providing DC power for a set of engine systems is disclosed in Korean Patent Publication No. KR1020180020459 that was filed by Korea Electronics Technology Institute on Aug. 18, 2016 and published on Feb. 28, 2018 ("the '459 publication"). In particular, the '459 publication discloses an engine variable-speed DC wiring system for fuel reduction and system simplification in a stand-alone diesel power generation system. The DC wiring system, disclosed in the '459 publication, can reduce power consumption by supplying variable power to a load stage according to power consumption at the load stage.

While the DC wiring system of the '459 publication may facilitate delivery of variable DC power to the load stage, the '459 publication does not disclose using a solid state power supply connected to a main alternator of an engine system to provide DC power to one or more batteries and/or one or more ECMs for a set of engine systems. The solid state power supply configuration for multiple engine systems of the present disclosure removes a need for an engine system to include a second alternator, such as a charging alternator, and solves one or more problems set forth above and/or other problems in the art.

SUMMARY

According to some implementations, the present disclosure is related to an engine system. The engine system may include an engine and an alternating current (AC) generator (e.g., a main alternator) coupled to the engine. The engine system may include a solid state power supply connected to the AC generator via a first circuit and an energy storage device connected to the solid state power supply via a second circuit. The engine system may include an engine control module (ECM) connected to the solid state power supply via the second circuit and a starter connected to the solid state power supply via the second circuit.

According to some implementations, the present disclosure is related to a machine. The machine may include a first engine and a second engine. The machine may include an alternating current (AC) generator (e.g., a main alternator) coupled to the first engine and a solid state power supply connected to the AC generator via a first circuit. The machine may include a first energy storage device associated with the first engine and connected to the solid state power supply via a second circuit and a first engine control module (ECM) associated with the first engine and connected to the solid state power supply via the second circuit. The machine may include a second energy storage device associated with the second engine and connected to the solid state power supply via the second circuit and a second ECM associated with the second engine and connected to the solid state power supply via the second circuit.

According to some implementations, the present disclosure is related to a generation set. The generation set may include a plurality of engines and an alternating current (AC) generator (e.g., a main alternator) coupled to a first engine of the plurality of engines. The generation set may include a solid state power supply connected to the AC generator via a first circuit. The generation set may include a plurality of energy storage devices associated with the plurality of engines, wherein the plurality of energy storage devices are connected to the solid state power supply via a second circuit. The generation set may include a plurality of engine control modules (ECMs) associated with the plurality of engines, wherein the plurality of ECMs are connected to the solid state power supply via a third circuit.

DETAILED DESCRIPTION

This disclosure relates to a solid state power supply configuration. The solid state power supply configuration has universal applicability to any machine utilizing such a solid state power supply configuration. The term "machine" may refer to any machine that performs an operation associated with an industry such as, for example, mining, construction, farming, transportation, or any other industry. As some examples, the machine may be a generator system, a vehicle (e.g., a land-based vehicle or marine vehicle), a fracture rig, and/or the like. Moreover, one or more implements may be connected to the machine and controlled using an internal combustion engine associated with the solid state power supply configuration described herein.

Figure 1:
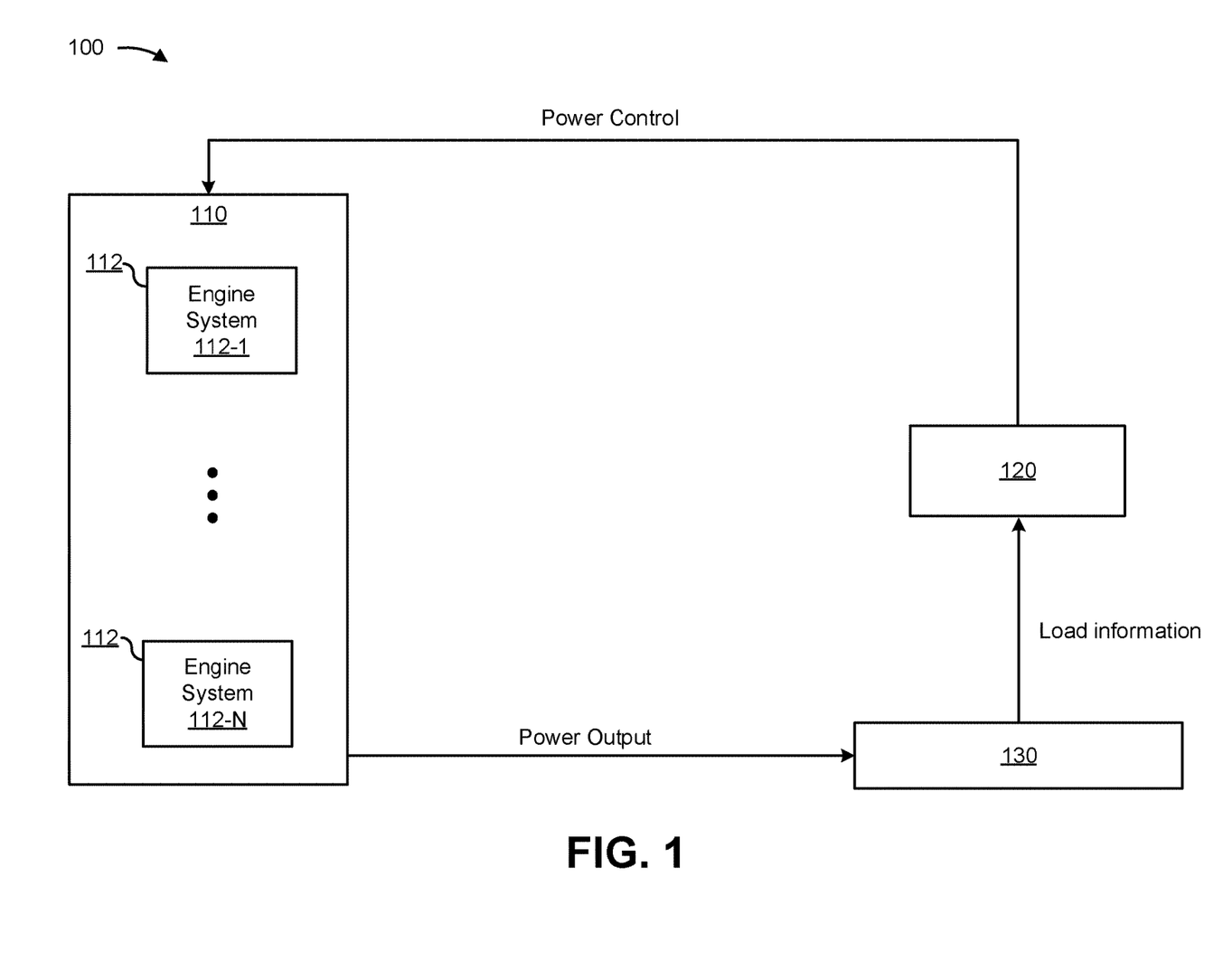
FIG. 1 is a diagram of an example power system described herein.

FIG. 1 is a diagram of an example power system 100 described herein. Power system 100 of FIG. 1 includes power generation system 110 with a plurality of engine systems 112 (shown as engine system 1 to engine system N, where N is an integer and N>1), an engine controller 120, and a load 130. The plurality of engine systems 112 may be referred to herein collectively as "engine systems 112" or individually as "engine system 112." As shown and described herein, engine controller 120 may control engine systems 112 of power generation system 110 to provide mechanical and/or electrical power to load 130.

In some implementations, the plurality of engine systems 112 may be a set of generators (e.g., which may be referred to as a "generator set" or "genset") configured to provide electrical power to a load. As described herein, one or more of engine systems 112 may include a compression ignition, internal combustion engine. Additionally, or alternatively, one or more of engine systems 112 may include any other type of internal combustion engine, such as, for example, a spark, laser, or plasma ignition engine. The engines of engine systems 112 may be fueled by distillate diesel fuel, biodiesel, dimethyl ether, gaseous fuels, such as hydrogen, natural gas, propane, alcohol, ethanol, and/or any combination thereof.

In some implementations, each of the engine systems 112 may include a same type of engine. For example, all engine systems 112 may include engines that are a same model, made by a same manufacturer, configured to output a same amount of maximum power and/or torque, configured to operate in a same manner, and/or the like. In some implementations, one or more of the engines of the engine systems 112 may be a different type relative to another engine of the engine systems 112. In such cases, a first engine may be a first type of engine configured to output a first amount of maximum power and a second engine may be a second type of engine configured to output a second amount of maximum power that is different from the first amount of maximum power. Furthermore, the engines of engine systems 112 may be made by a different manufacturer and/or be a different model of engine.

Engine controller 120 includes one or more devices that provide power control information to control power output from power generation system 110. In some implementations, engine controller 120 is implemented as a processor, such as a central processing unit (CPU), an accelerated processing unit (APU), a microprocessor, a microcontroller, a digital signal processor (DSP), a field-programmable gate array (FPGA), an application-specific integrated circuit (ASIC), or another type of processing component. The processor is implemented in hardware, firmware, or a combination of hardware and software. In some implementations, engine controller 120 includes one or more processors capable of being programmed to perform a function. In some implementations, one or more memories, including a random access memory (RAM), a read only memory (ROM), and/or another type of dynamic or static storage device (e.g., a flash memory, a magnetic memory, and/or an optical memory) may store information and/or instructions for use by engine controller 120. In some implementations, engine controller 120 may include a memory (e.g., a non-transitory computer-readable medium) capable of storing instructions, that when executed, cause the processor to perform one or more processes and/or methods described herein.

Engine controller 120 may include any appropriate type of engine control system configured to perform optimization functions, prioritization functions, and/or power control functions. In operation, engine controller 120 may execute computer software instructions to perform various control functions and processes to control power generation system 110. As shown in the example of FIG. 1, engine controller 120 (e.g., via execution of the computer software instructions) provides power control information to power generation system 110 to provide power output to load 130, which may include one or more devices driven by electrical power.

As indicated above, FIG. 1 is provided as an example. Other examples are possible and may differ from what was described in connection with FIG. 1.

Figure 2:
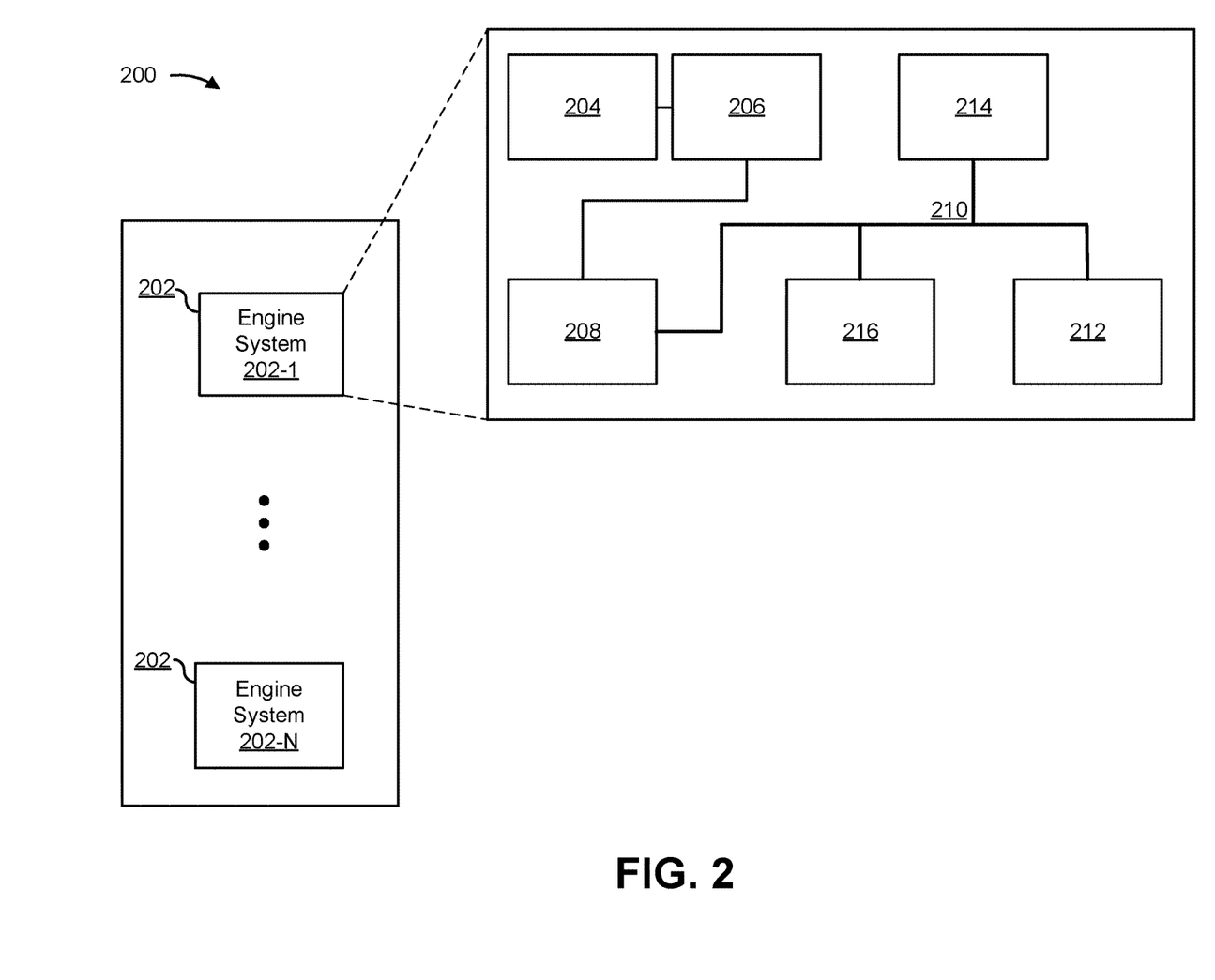
FIG. 2 is a diagram of an example engine system that may be included within the power system of FIG. 1, as described herein.

FIG. 2 is a diagram of an example power generation system 200 that includes a plurality of engine systems 202 (shown as engine system 1 to engine system N, where N is an integer and N>1). As further shown in FIG. 2, engine system 202-1 includes a solid state power supply configuration. In some implementations, engine system 202-1 may include one or more components, such as an engine 204, an alternating current (AC) generator 206 (e.g., a main alternator), a solid state power supply 208, a connection 210, an energy storage device 212, an engine control module (ECM) 214, a starter 216, and/or the like.

In some implementations, the AC generator 206 may be operably coupled to the engine 204. For example, the engine 204 may be configured to cause rotation of one or more components of the AC generator 206. In some implementations, the AC generator 206 may include an alternator that is configured to convert the mechanical input from the engine 204 into electricity. For example, the AC generator 206 may include a rotor assembly coupled to a rotating shaft of the engine 204 (e.g., via engine pulleys) and configured to rotate within a stator assembly to generate electrical energy. In some implementations, the AC generator 206 may convert the mechanical input from the engine 204 into alternating current electricity. In some implementations, the AC generator 206 may be configured to supply generated electrical energy to meet an electrical load in the form of electrical current supplied through the connection 210. In some implementations, the AC generator 206 may provide alternating current electricity to the solid state power supply 208 via the connection 210 and/or another electrical circuit.

In some implementations, the solid state power supply 208 may be connected to the AC generator 206 via the connection 210 and/or another electrical circuit. In some implementations, the solid state power supply 208 may include a rectifier, charger, and/or the like. In some implementations, the solid state power supply 208 may include one or more components configured to convert alternating current electricity to direct current electricity. For example, the solid state power supply 208 may include one or more diodes, a diode bridge, and/or the like.

In some implementations, the solid state power supply 208 may be configured to convert alternating current electricity into direct current electricity used to charge the energy storage device 212 and/or power the ECM 214 and/or the starter 216. In some implementations, the solid state power supply 208 may provide the direct current electricity to the energy storage device 212, the ECM 214, and/or the starter 216 via the connection 210 and/or another electrical circuit.

Accordingly, some implementations allow the AC generator 206 (e.g., a main alternator) to provide electrical power to the energy storage device 212, the ECM 214, the starter 216, and/or the like via the solid state power supply 208. In this way, the engine system 202-1 does not need a second alternator, such as a charging alternator, to provide electrical power to the energy storage device 212, the ECM 214, the starter 216, and/or the like.

In some implementations, the solid state power supply 208 may provide direct current electricity at an ambient temperature range, such as −20 degrees Celsius to 70 degrees Celsius, −10 degrees Celsius to 60 degrees Celsius, 25 degrees Celsius to 73 degrees Celsius, and/or the like. In some implementations, the solid state power supply 208 may provide the direct current electricity at an amperage that satisfies a threshold amperage (e.g., the amperage of the direct current electricity is at or below a particular amperage, at or above a particular amperage, and/or the like). For example, the solid state power supply 208 may provide the direct current electricity if the amperage of the direct current electricity is below a threshold amperage, such as 40 amps, 44 amps, 60 amps, 72 amps, 80 amps, and/or the like.

In some implementations, the solid state power supply 208 may provide diagnostic information regarding the AC generator 206. In some implementations, the solid state power supply 208 may provide diagnostic information regarding the alternating current electricity provided by the AC generator 206. In some implementations, the solid state power supply 208 may provide a diagnostic process regarding the alternating current electricity provided by the AC generator. For example, the solid state power supply 208 may include computing components, such as a processor, memory, and/or the like, for performing diagnostics on the AC generator 206 and/or the alternating current electricity provided by the AC generator 206 and providing diagnostic information via a user interface. A user may interact with the AC generator 206 via the user interface to obtain the diagnostic information regarding the AC generator 206, the alternating current electricity provided by the AC generator 206, and/or the like.

In some implementations, the connection 210 may include one or more electrical connections that allow electrical current to flow from one electrical component to another electrical component. For example, the connection 210 may allow electrical current (e.g., direct current electricity) to flow from the solid state power supply 208 to one or more electrical components, such as the energy storage device 212, the ECM 214, the starter 216, and/or the like, to provide power to the one or more electrical components. For example, the connection 210 may include an electrical connection from the solid state power supply 208 to the energy storage device 212 that allows the solid state power supply 208 to supply power to the energy storage device 212.

In some implementations, the energy storage device 212 may be connected to the solid state power supply 208 via the connection 210 and/or another electrical circuit. In some implementations, the energy storage device 212 may include, for example, one or more components configured to store electrical energy. For example, the energy storage device 212 may include a capacitor, a battery, or the like. The energy storage device 212 may be electrically coupled with the solid state power supply 208 via the connection 210 and may be configured to receive electric current (e.g., direct current electricity) from the solid state power supply 208. In some implementations, the energy storage device 212 may store electric power (e.g., an electric charge) based on the electric current. Additionally, or alternatively, the energy storage device 212 may supply electric current (e.g., direct current electricity) to the ECM 214, the starter 216, and/or the like via the connection 210 and/or another electrical circuit. For example, when the engine 204 is off (and the AC generator 206 is not generating electricity), the energy storage device 212 may provide direct current electricity to the starter 216 to start the engine 204.

In some implementations, the ECM 214 may be connected to the solid state power supply 208 via connection 210 and/or another electrical circuit. In some implementations, the ECM 214 may include one or more devices that provide corresponding control of engine 204. In some implementations, the ECM 214 is implemented as a processor, such as a central processing unit (CPU), an accelerated processing unit (APU), a microprocessor, a microcontroller, a digital signal processor (DSP), a field-programmable gate array (FPGA), an application-specific integrated circuit (ASIC), and/or another type of processing component. The processor is implemented in hardware, firmware, or a combination of hardware and software. In some implementations, the ECM 214 includes one or more processors capable of being programmed to perform a function. In some implementations, one or more memories, including a random access memory (RAM), a read only memory (ROM), and/or another type of dynamic or static storage device (e.g., a flash memory, a magnetic memory, and/or an optical memory) may store information and/or instructions for use by the ECM 214. In some implementations, the ECM 214 may include a memory (e.g., a non-transitory computer-readable medium) capable of storing instructions, that when executed, cause the processor to perform one or more processes and/or methods described herein.

In some implementations, the ECM 214 may execute the instructions to perform various control functions and processes to control engine 204. The ECM 214 may include any appropriate type of engine control system configured to perform engine control functions such that engine 204 may operate properly. Further, the ECM 214 may also control another system of a vehicle or machine, such as a transmission system, a hydraulics system, and/or the like.

In some implementations, the starter 216 may be connected to the solid state power supply 208 and/or the engine 204 via connection 210 and/or another electrical circuit. In some implementations, the starter 216 may include one or more devices to initiate operation of the engine 204. In some implementations, the starter 216 may draw electrical power from the energy storage device 212 via connection 210 and/or another electrical circuit to start the engine 204. For example, the starter 216 may apply electric current (e.g. direct current electricity) supplied by the energy storage device 212 to turn a pinion that engages with a flywheel gear ring of the engine 204 to start the engine 204.

The number and arrangement of components shown in FIG. 2 are provided as an example. In practice, there may include additional components, fewer components, different components, or differently arranged components than those shown in FIG. 2. Additionally, or alternatively, a set of components (e.g., one or more components) of power generation system 200 may perform one or more functions described as being performed by another set of components of power generation system 200.

Figure 3:
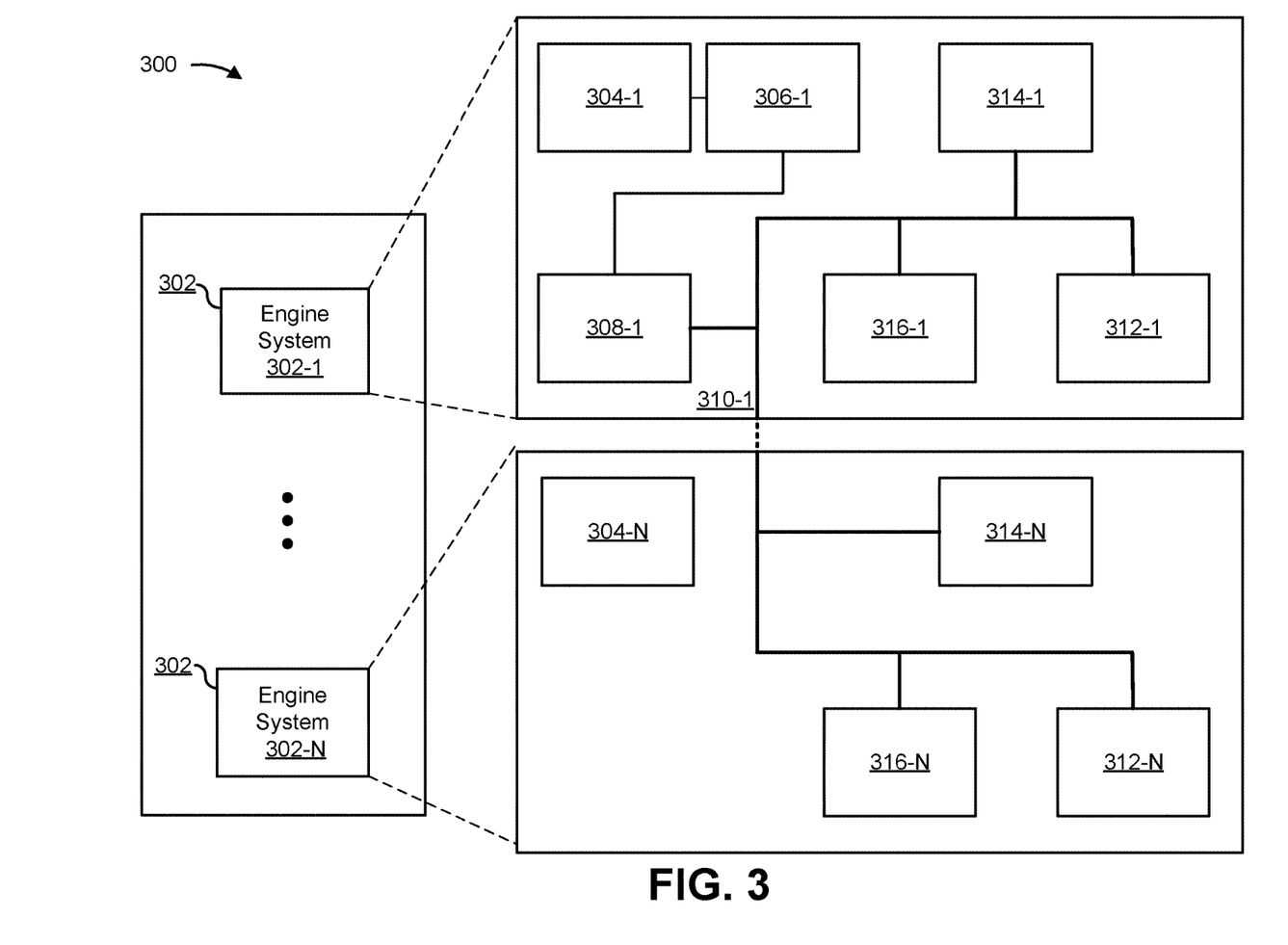
FIG. 3 is a diagram of example engine systems that may be included within the power system of FIG. 1, as described herein.

FIG. 3 is a diagram of an example power generation system 300 that includes a plurality of engine systems 302 (shown as engine system 1 to engine system N, where N is an integer and N>1). Engine system 302-1 includes a solid state power supply configuration that is similar to engine system 202-1, as described herein in relation to FIG. 2. For example, as shown in FIG. 3, engine system 302-1 may include one or more components, such as an engine 304-1, an AC generator 306-1 (e.g., a main alternator), a solid state power supply 308-1, a connection 310-1, an energy storage device 312-1, an ECM 314-1, a starter 316-1, and/or the like, where each component of the one or more component has a similar structure and functionality of a corresponding component of engine system 202-1 (e.g., the engine 304-1 corresponds with the engine 204, the AC generator 306-1 corresponds with the AC generator 206, etc.).

As further shown in FIG. 3, engine system 302-N (e.g., a representative engine system of one or more engine systems 302-N) is similar to engine system 202-1 and engine system 302-1. In some implementations, engine system 302-N may include one or more components, such as an engine 304-N, an AC generator 306-N (e.g., a main alternator) (not pictured), an energy storage device 312-N, an ECM 314-N, a starter 316-N, and/or the like, where each component of the one or more components has a similar structure and functionality of a corresponding component of engine system 202-1 and/or 302-1. In some implementations, engine system 302-N does not include an AC generator or a solid state power supply. Instead, one or more components of engine system 302-N are connected to the solid state power supply 308-1 of engine system 302-1 via connection 310-1 and/or another electrical circuit.

Accordingly, some implementations allow the AC generator 306-1 (e.g., a main alternator) of engine system 302-1 to provide electrical power to the energy storage device 312-N, the ECM 314-N, the starter 316-N, and/or the like via the solid state power supply 308-1. In this way, the engine system 302-N does not need a second alternator, such as a charging alternator, to provide electrical power to the energy storage device 312-N, the ECM 314-N, the starter 316-N, and/or the like.

In some implementations, the energy storage device 312-1, the ECM 314-1, and/or the starter 316-1, which are associated with engine 304-1, may be connected to the solid state power supply 308-1 via the connection 310-1 and/or another electric circuit. Further, the energy storage device 312-N, the ECM 314-N, and/or the starter 316-N, which are associated with engine 304-N, may be connected to the solid state power supply 308-1 via the connection 310-1 and/or another electric circuit. In some implementations, the solid state power supply 308-1 may provide direct current electricity to the energy storage device 312-1, the ECM 314-1, the starter 316-1, the energy storage device 312-N, the ECM 314-N, and/or the starter 316-N via the connection 310-1 and/or another electric circuit. In some implementations, the energy storage device 312-1 may supply electric current (e.g., direct current electricity) to the ECM 314-1 via a first alternative circuit (e.g., an electric circuit that is not the connection 310-1) and/or the energy storage device 312-N may supply electric current (e.g., direct current electricity) to the ECM 314-N via a second alternative circuit (e.g., an electric circuit that is not the connection 310-1 and/or the first alternative circuit). In some implementations, ECM 314-1 may control engine 304-1 and ECM 314-N may control engine 304-N.

In some implementations, the energy storage device 312-1 and/or the energy storage device 312-N may be connected to the solid state power supply 308-1 via a first circuit (e.g., connection 310-1 and/or another electric circuit). In some implementations, the ECM 314-1 and/or the ECM 314-N may be connected to the solid state power supply 308-1 via a second circuit (e.g., connection 310-1 and/or another electric circuit, but not the first circuit). In some implementations, starter 316-1 and/or starter 316-N may be connected to the solid state power supply 308-1 via a third circuit (e.g., connection 310-1 and/or another electric circuit, but not the first circuit or the second circuit). In some implementations, the solid state power supply 308-1 may provide direct current electricity to the energy storage device 312-1 and/or the energy storage device 312-N via the first circuit, the ECM 314-1 and/or the ECM 314-N via the second circuit, and/or the starter 316-1 and/or the starter 316-N via the third circuit. In some implementations, the energy storage device 312-1 and/or the energy storage device 312-N may supply electric current (e.g., direct current electricity) to the ECM 314-1 and/or the ECM 314-N via a fourth circuit (e.g., connection 310-1 and/or another electric circuit, but not the first circuit, the second circuit, or the third circuit). In some implementations, the energy storage device 312-1 and/or the energy storage device 312-N may supply electric current (e.g., direct current electricity) to starter 316-1 and/or starter 316-N via a fifth circuit (e.g., connection 310-1 and/or another electric circuit, but not the first circuit, the second circuit, the third circuit, or the fourth circuit). In some implementations, the ECM 314-1 may be connected to engine 304-1 via a sixth circuit (e.g., connection 310-1 and/or another electric circuit, but not the first circuit, the second circuit, the third circuit, the fourth circuit, or the fifth circuit) and may control engine 304-1. In some implementations, the ECM 314-N may be connected to engine 304-N via a seventh circuit (e.g., connection 310-1 and/or another electric circuit, but not the first circuit, the second circuit, the third circuit, the fourth circuit, the fifth circuit, or the sixth circuit) and may control engine 304-N.

The number and arrangement of components shown in FIG. 3 are provided as an example. In practice, there may include additional components, fewer components, different components, or differently arranged components than those shown in FIG. 3. Additionally, or alternatively, a set of components (e.g., one or more components) of power generation system 300 may perform one or more functions described as being performed by another set of components of power generation system 300.

INDUSTRIAL APPLICABILITY

In some instances, a power generation system may include a plurality of engine systems, where an engine system, of the plurality of engine systems, includes an engine and one or more electrical components. In some instances, the engine system includes a main alternator (e.g., for providing electrical power to a load) as well as additional electricity generation components, such as a second alternator (e.g., a charging alternator), a rectifier, a charger, and/or the like to provide electrical power to the one or more electrical components. However, the electricity generation components are expensive, complex mechanical components that need to be mounted on the engine of the engine system. Further, due to the mechanical nature of the electricity generation components, the electricity generation components are prone to failure, damage, and/or the like and require regular maintenance and repair, which affects the operation and/or availability of the engine system.

According to some implementations described herein, a power generation system includes a first engine system and one or more second engine systems. In some implementations, the first engine system (e.g., engine system 202-1, 302-1, and/or the like) may include an engine (e.g., engine 204, 304-1, and/or the like), an AC generator (e.g., AC generator 206, AC generator 306-1, and/or the like), such as a main alternator, and a solid state power supply (e.g., solid state power supply 208, solid state power supply 308-1, and/or the like). The solid state power supply may be connected, via an electrical connection (e.g., connection 210, connection 310-1, and/or the like) to one or more electrical components of the first engine system, such as a first energy storage device (e.g., energy storage device 212, energy storage device 312-1, and/or the like), a first ECM (e.g., ECM 214, ECM 314-1, and/or the like), a first starter (e.g., starter 216, starter 316-1, and/or the like), and/or the like, and one or more electrical components of the one or more second engine systems, such as a second energy storage device (e.g., energy storage device 312-N and/or the like), a second ECM (e.g. ECM 314-N and/or the like), a second starter (e.g., starter 316-N and/or the like), and/or the like.

Accordingly, the first engine system may generate and provide electrical power to the one or more electrical components of the one or more second engine systems. Therefore, the one or more second engine systems may not need electricity generation components, such as a second alternator (e.g., a charging alternator), a rectifier, a charger, and/or the like to provide electrical power to the one or more electrical components of the one or more second engine systems. As such, the mechanical complexity of the one or more second engine systems may be reduced. This may increase the life of the one or more second engine systems and/or reduce the amount of maintenance that the one or more second engine systems require.

Furthermore, costs associated with producing the power generation system may be minimized and/or conserved by installing and maintaining the AC generator and the solid state power supply on only the first engine system. Moreover, downtime of the power generation system may be more predictable as efficient maintenance schedules can be generated and/or configured to enable service of the AC generator and/or the solid state power supply (as opposed to scheduling maintenance for electricity generation components associated with each engine system). Accordingly, costs associated with maintaining the power generation system can be decreased and/or minimized.

As used herein, the articles "a" and "an" are intended to include one or more items, and may be used interchangeably with "one or more." Also, as used herein, the terms "has," "have," "having," or the like are intended to be open-ended terms. Further, the phrase "based on" is intended to mean "based, at least in part, on."

The foregoing disclosure provides illustration and description, but is not intended to be exhaustive or to limit the implementations to the precise form disclosed. Modifications and variations are possible in light of the above disclosure or may be acquired from practice of the implementations. It is intended that the specification be considered as an example only, with a true scope of the disclosure being indicated by the following claims and their equivalents. Even though particular combinations of features are recited in the claims and/or disclosed in the specification, these combinations are not intended to limit the disclosure of possible implementations. Although each dependent claim listed below may directly depend on only one claim, the disclosure of possible implementations includes each dependent claim in combination with every other claim in the claim set.

What is claimed is:

1. A machine, comprising:
   a first engine of a first engine system;
   a second engine of a second engine system;
   an alternating current (AC) generator coupled to the first engine;
   a solid state power supply of the first engine system,
      wherein the second engine system receives direct current electricity only from the solid state power supply,
      wherein the second engine system does not include a solid state power supply, and
      wherein the solid state power supply is connected to the AC generator via a first circuit;
   a first energy storage device of the first engine system,
      the first energy storage device being connected to the solid state power supply via a second circuit;
   a first engine control module (ECM) for controlling the first engine,
      the first ECM being connected to the solid state power supply via the second circuit;
   a second energy storage device of the second engine system,
      the second energy storage device being connected to the solid state power supply via the second circuit; and
   a second ECM for controlling the second engine,
      the second ECM being connected to the solid state power supply via the second circuit.

2. The machine of claim 1, wherein the solid state power supply includes a rectifier to convert alternating current electricity to the direct current electricity and provide the direct current electricity at an amperage that satisfies a threshold amperage.

3. The machine of claim 1, wherein the solid state power supply is to provide the direct current electricity to the first energy storage device, the first ECM, the second energy storage device, and the second ECM via the second circuit.

4. The machine of claim 1,
   wherein the AC generator is to provide alternating current electricity to the solid state power supply, and
   wherein the solid state power supply is to provide diagnostic information regarding the alternating current electricity provided by the AC generator.

5. The machine of claim 1,
   wherein the solid state power supply is to provide the direct current electricity to the first energy storage device and the second energy storage device via the second circuit,
   wherein the first energy storage device is to provide the direct current electricity to the first ECM via a third circuit, and
   wherein the second energy storage device is to provide the direct current electricity to the second ECM via a fourth circuit.

6. The machine of claim 1, wherein the first energy storage device is to provide the direct current electricity to the first ECM via a third circuit.

7. The machine of claim 1, wherein the solid state power supply is configured to convert alternating current electricity into the direct current electricity.

8. The machine of claim 1, wherein the solid state power supply is configured to provide diagnostic information regarding alternating current electricity provided by the AC generator.

9. The machine of claim 1, further comprising:
   a third engine of a third engine system,
      wherein the third engine system receives the direct current electricity only from the solid state power supply.

10. The machine of claim 1, further comprising:
    a third engine of a third engine system,
       wherein the third engine system does not include another AC generator or another solid state power supply.

11. A system comprising:
    a first engine system including:
       a first engine,
       a solid state power supply, and
       a first energy storage device connected to the solid state power supply; and
    a second engine system including:
       a second engine, and
       a second energy storage device connected to the solid state power supply,
          the first energy storage device and the second energy storage device receiving direct current electricity only from the solid state power supply, and
          the second engine system not including a solid state power supply.

12. The system of claim 11, wherein the first engine system further includes:
an alternating current (AC) generator.

13. The system of claim 12, wherein the second engine system does not include an AC generator.

14. The system of claim 12, wherein the first engine is configured to cause rotation of one or more components of the AC generator.

15. The system of claim 12, wherein the AC generator is configured to convert mechanical input from the first engine into alternating current electricity.

16. The system of claim 11, wherein the solid state power supply includes components configured to convert alternating current electricity into the direct current electricity.

17. The system of claim 11, wherein the first engine system includes a first engine control module (ECM) to control the first engine.

18. The system of claim 17, wherein the second engine system includes a second engine control module (ECM) to control the second engine.

19. The system of claim 11, wherein the direct current electricity is used to charge the first energy storage device.

20. The system of claim 11, wherein the solid state power supply is configured to provide the direct current electricity at an ambient temperature range.

* * * * *